United States Patent [19]

Elliott et al.

[11] Patent Number: 5,012,381
[45] Date of Patent: Apr. 30, 1991

[54] MOTOR DRIVE CIRCUIT WITH REVERSE-BATTERY PROTECTION

[75] Inventors: Robert S. Elliott, Barrington, Ill.; Kim R. Gauen, Tempe, Ariz.

[73] Assignee: Motorola, Inc., Schaumburg, Ill.

[21] Appl. No.: 406,627

[22] Filed: Sep. 13, 1989

[51] Int. Cl.$^5$ .............................. H02H 3/18; H02J 7/00
[52] U.S. Cl. .................................. 361/84; 320/25; 323/351
[58] Field of Search ............ 361/139, 33, 84, 285–287, 361/323, 23, 78, 82; 323/285–287, 351; 320/25, 26, 49, 50; 307/112, 116, 125, 127

[56] References Cited

U.S. PATENT DOCUMENTS

| 4,323,845 | 4/1982 | Leach | 323/285 |
| 4,423,456 | 12/1983 | Zaidenweber | 320/26 |
| 4,679,112 | 7/1987 | Craig | 361/84 |

OTHER PUBLICATIONS

IBM Corp., IBM Technical Disclosure Bulletin, vol. 29, No. 2, Jul. 1986, pp. 567–569.

Primary Examiner—A. D. Pellinen
Assistant Examiner—Richard T. Elms
Attorney, Agent, or Firm—John H. Moore

[57] ABSTRACT

A relay-less drive circuit for an inductive load preferably uses a transistor switch to couple the load to a battery, and provides a path for recirculating current around the load, which path includes a recirculating diode coupled in series with another transistor switch, such as an FET. the FET's drain and source terminals are connected to the recirculating diode, and the FET is biased, such that the FET is on when the battery is connected to the load with its nominal polarity, and the FET is off when the polarity of the battery is reversed.

8 Claims, 1 Drawing Sheet

MOTOR DRIVE CIRCUIT WITH REVERSE-BATTERY PROTECTION

FIELD OF THE INVENTION

This invention is generally directed to the field of electronic motor drive circuits, and particularly to such circuits as are used in automotive applications.

BACKGROUND OF THE INVENTION

Motor drive circuits that are designed for use in automotive applications must be highly reliable and be able to withstand "reverse-battery" conditions without failing. A "reverse-battery" condition occurs when the terminals of an automotive battery are connected with the wrong polarity.

A conventional automotive motor drive circuit 10 is shown in FIG. 1. The illustrated circuit includes a motor 12 that is powered by a battery 14 which is part of an automotive charging system. Connected in parallel with the battery is a diode 16 and a relay coil 18. With the battery connected to the coil 18 as shown, the coil is energized to close a contact set 20 and thereby to couple a circulating diode 22 in parallel with the motor 12.

An FET (field effect transistor) 24 is connected between the motor and the negative terminal of the battery and, as shown, the FET has an "intrinsic diode" 26 coupled between its drain and source. The term "intrinsic diode" means a diode which is inherently part of the semiconductor structure which forms the FET. To turn the motor on, a control pulse P is applied to the gate of the FET 24. When the control pulse is removed, recirculating current flows through the diode 22 and the motor 12.

The arrangement of the relay coil 18, contact set 20 and diode 16 prevents a high level of current from flowing when a reverse-battery condition occurs. In that situation, the diode 16 becomes reverse biased, thereby de-energying the coil 18 and opening the contact set 20. As a result, no current flows through the diode 22. Although current does flow through the diode 26 and the motor 12, the resistance of the motor winding limits the current to a safe level.

It is desirable to avoid the use of relays in the type of application discussed above, not only for cost reasons, but also to provide a more reliable drive circuit for motors and other types of inductive loads.

OBJECTS OF THE INVENTION

It is a general object of the invention to provide an improved motor drive circuit that overcomes the problems mentioned above. It is a more specific object of the invention to provide a motor drive circuit that uses no relay, and yet provides reverse-battery protection in an economical and reliable manner.

DESCRIPTION OF THE PREFERRED EMBODIMENT

Figure 1:
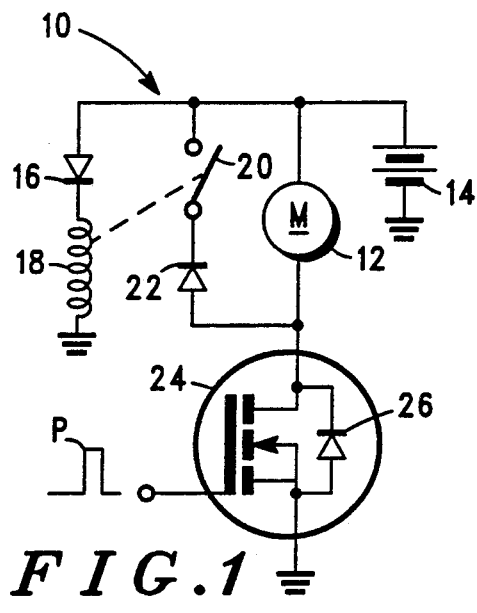
FIG. 1, previously discussed, is a schematic diagram of a conventional motor drive circuit.
Figure 2:
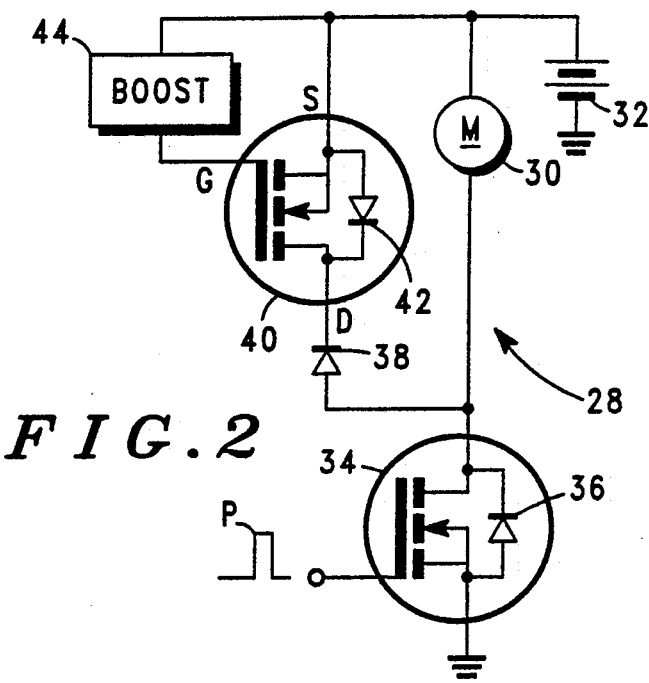
FIG. 2 is a schematic diagram of a drive circuit constructed in accordance with the invention.

Referring now to FIG. 2, there is shown a drive circuit 28 that incorporates various features of the invention. This particular circuit has a DC motor 30 that is powered by a vehicle battery 32 without the use of any relays, and yet incorporating reverse-battery protection in an economical and reliable manner. Although this embodiment and the others that are shown herein illustrate drive circuits for motors, it should be understood that the invention is also useful for other types of inductive loads. This circuit includes a first switch, shown in a form of a FET 34, that couples the motor 30 to the battery 32 so as to establish a path for current through the motor. The FET 34 has an intrinsic diode 36 coupled across its drain and source terminals as shown, and a gate terminal that receives a turn-on pulse P whenever the motor is to be energized.

A path for recirculating current is established around the motor 30, and this path includes a recirculating diode 38 that is poled in a first direction, and a transistor switch, here shown as an "N" channel FET 40. An intrinsic diode 42 is coupled in parallel with the FET 40 and is poled in a direction opposite to the polarity of the diode 38. More specifically, the FET 40 is connected so that its drain terminal is coupled to the cathode of the diode 38, and its source terminal is coupled to one side of the motor 30. With this arrangement, the diode 42 is advantageously poled directly opposite to the diode 38.

The gate terminal (control electrode) of the FET 40 is preferably coupled to bias means that causes the transistor switch (FET) 40 to turn on when the battery 32 is coupled to the motor 30 with its nominal polarity, and which holds the transistor switch off when the battery is coupled to the motor with the reverse polarity. In this embodiment, the bias means may take the form of a conventional boost circuit 44 that is connected between the positive terminal of the battery 32 and the gate terminal of the FET 40. As known in the art, boost circuits operate to derive from a positive voltage supply (such as from battery 32) a higher bias voltage that may be used as a turn-on voltage, but when the supply voltage (such as battery 32) has a reverse polarity, the output of the boost voltage goes to zero. Alternately, the gate of the FET 40 may be coupled through a resistor to any conventional voltage source that turns the FET 40 on when the battery is connected with its nominal polarity, and which causes the FET 40 to turn off when the battery is connected with the reverse polarity.

In operation, and assuming that the polarity of the battery 32 is as shown, the boost circuit operates to turn on the transistor switch 40 to complete a path for recirculating current to flow through the motor 30. When a control pulse P is applied to the gate of the transistor 34, the motor 30 turns on and its current flows from the battery 32, through the motor 30, and back to the battery 32 via the transistor 34. When the pulse P removed, the transistor 34 turns off, and the reaction of the motor causes a positive potential to appear at the anode of the diode 38. With the FET 40 turned on, recirculating current now flows from the motor 30 through the diode 38 and the FET 40 and back to the motor 30. However, when the polarity of the battery 32 is reversed, the boost circuit does not output a voltage which can turn on the FET 40. Further, the opposing polarities of the diodes 38 and 42 preclude any current flowing through them. Therefore, an open circuit is provided in the recirculating path of the motor 30. Hence, the only path for the flow of current (in the reverse-battery condition) is through the diode 36 and the motor 30, but this level of current is not destructive because it is limited by the resistance of the windings of the motor 30.

It can be seen, therefore, that the circuit 28 provides an economical and reliable motor drive that achieves reverse-battery protection without the use of a relay.

It should be pointed out that the driver circuit shown in FIG. 2 does not require the use of an FET 40 that has an intrinsic diode, because the "off" condition of the FET 40 prohibits current flow in the recirculation path in the reverse-battery condition. But if the FET used in the recirculation path does have an intrinsic diode, then that FET should be connected in circuit as shown herein to ensure that its intrinsic diode is poled oppositely to the recirculating diode 38 to avoid creating an unwanted current path in the reverse-battery condition. In the discussion below, it is assumed that each FET has its own intrinsic diode.

Figure 3:
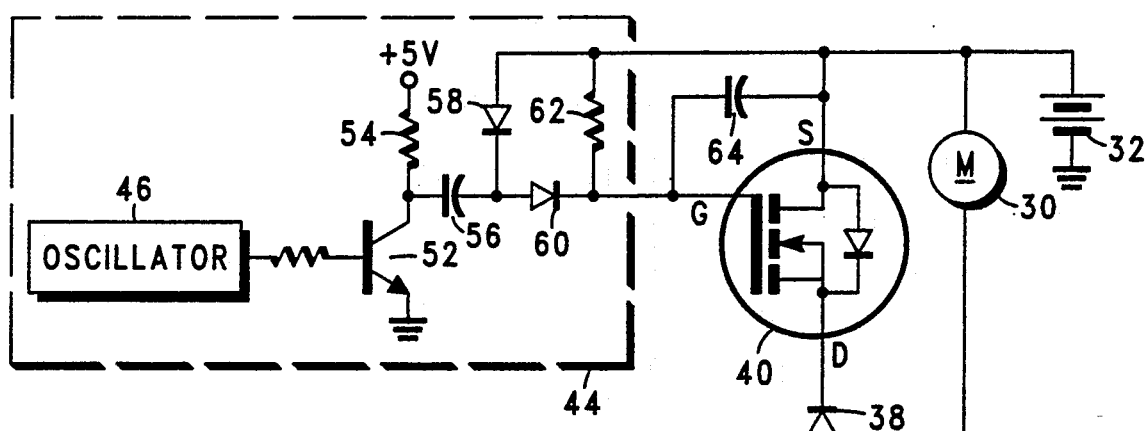
FIG. 3 shows the drive circuit of FIG. 2, and additionally shows the details of an exemplary boost circuit.

Turn now to FIG. 3 which shows the same motor drive circuit as FIG. 2, but with additional details of an exemplary boost circuit 44. Only the operation of the boost circuit will be explained, as the operation of the remainder of the circuit has already been discussed.

The illustrated boost circuit includes an oscillator 46 that switches an NPN transistor 52 on and off. The collector of the transistor 52 is coupled through a resistor 54 to a 5 volt supply that may be derived from the battery 32. Also coupled to the collector of the transistor 52 is a capacitor 56, the opposite side of which is coupled to a pair of diodes, 58 and 60. A resistor 62 is coupled from the gate of the FET 40 to the battery 32, and a capacitor 64 is coupled from the source to the gate of the FET 40. The capacitor 64 represents the internal gate-to-source capacitance of the FET 40.

The boost circuit operates as follows. When the transistor 52 is on, the capacitor 56 becomes charged by current flowing through a path that includes the diode 58, the capacitor 56 and the transistor 52. Because the resistance of this path is low, the capacitor 56 quickly charges to a voltage that is approximately equal to the battery voltage (VBAT).

The capacitor 64 starts out with no charge. When the transistor 52 turns off, the left side of capacitor 56 (the electrode of capacitor 56 that is connected to the collector of transistor 52) charges to 5 volts, and the voltage on the other electrode of capacitor 56 rises to VBAT plus 5 volts (typically, 17 volts). The diode 60 becomes forward biased and charges the left side of the capacitor 64 toward VBAT plus 5 volts. When the voltage on the capacitor 64 reaches approximately VBAT plus 2.5 volts, the FET 40 begins to conduct.

When the oscillator 46 turns the transistor 52 on again, the right side of capacitor 56 drops to VBAT, thereby turning off the diode 60 and trapping the charge on the capacitor 64. The resistor 62 is typically a large value resistor (e.g., 1 megohm) that permits the capacitor 64 to discharge very slowly. The value of the capacitor 56 (.1 microfarad, e.g.) should be much larger than the value of the capacitor 64 (1500 picofarads, e.g.) to maximize the voltage transfer to capacitor 64.

As the oscillator 46 continues to switch the transistor 52 off and on, the charge on capacitor 64 will be maintained and the FET 40 will remain on. However, if the polarity of the battery 32 should become reversed, the boost circuit 44 will cause the FET 40 to turn off.

Figure 4:
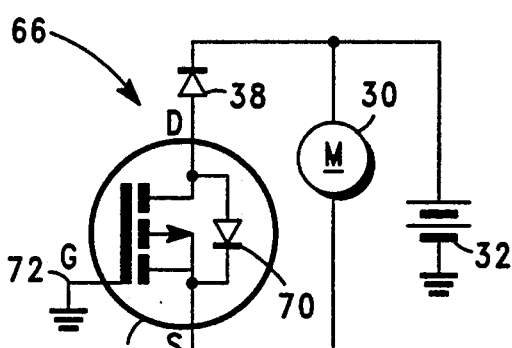
FIG. 4 is a schematic diagram of an alternate drive circuit according to the invention.
Figure 4:
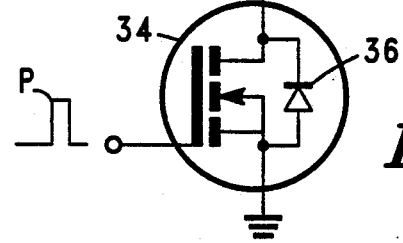

Turning now to FIG. 4, another motor drive circuit 66 is shown which is similar to the embodiment shown in FIG. 2 and in which corresponding elements have corresponding reference numerals. It can be seen that the only difference between the embodiments of FIGS. 2 and 4 is that in the latter, the diode 38 is connected to the positive terminal of the battery, and a P channel FET 68 is used (plus its intrinsic diode 70), along with a different bias means for the FET 68. In this case, the bias means for the FET 68 is simply a connection 72 from ground (i.e., the common terminal of the battery) to the gate of the FET 68. With this arrangement, the ground connection 72 provides a bias which turns on the FET 68 when the battery is of the proper polarity but, in the reverse-battery situation, the FET 68 is turned off. This arrangement therefore provides a path for recirculating current through diode 38 and the FET 68 when the battery 32 has its nominal or proper polarity. In the reverse-battery condition, the FET 68 is held off, and all current which flows through the battery 32 flows only through the diode 36 and the motor 30 to thereby maintain the reverse current at a safe level.

Although the invention has been described in terms of preferred embodiments, it will be obvious to those skilled in the art that many alternations and modifications may be made without departing from the invention. Accordingly it is intended that all such modifications and alternations be considered as within the spirit and scope of the invention as defined by the appended claims.

What is claimed is:

1. In a system having an inductive load that is powered by a battery, a load drive circuit with reverse-battery protection, comprising a first switch coupling the battery to the load so as to establish a path for current through the load;

means defining a path for recirculating current around the load, including a recirculating diode and a transistor switch coupled in series with the recirculating diode and the load such that substantially all the recirculating current flows through the recirculating diode and the transistor switch; and bias means coupled to the transistor switch for turning the transistor switch on when the battery is coupled to the load with its nominal polarity, and for holding the transistor switch off in response to the battery being coupled to the load with a reverse polarity.

2. A load drive circuit as set forth in claim 1 wherein the recirculating diode is coupled to the transistor switch with a given polarity, wherein the transistor switch comprises a field-effect transistor having an intrinsic diode, a source terminal and a drain terminal, and wherein the source terminal and the drain terminal are coupled to the recirculating diode and to the load such that the intrinsic diode is poled opposite to the polarity of the recirculating diode.

3. A load drive circuit as set forth in claim 1 wherein the transistor switch comprises a field-effect transistor, and further including a diode coupled in parallel with the field-effect transistor.

4. A load drive circuit as set forth in claim 1 wherein the transistor switch has a control electrode, and wherein the bias means comprises a boost circuit coupled to the control electrode.

5. In a system having an inductive load that is powered by a battery, a load drive circuit with reverse-battery protection, comprising:

a first switch coupling the battery to the load so as to establish a path for current through the load;

means defining a path for recirculating current around the load, including a recirculating diode poled in a first direction, a field-effect transistor coupled in series with the recirculating diode and the load, and an intrinsic diode coupled in parallel with the field-effect transistor, the intrinsic diode being poled opposite to the polarity of the recirculating diode; and bias means coupled to the field-effect transistor for turning the field-effect transistor on when the battery is coupled to the load with its nominal polarity, and for holding the field-effect transistor off in response to the battery being coupled to the load with a reverse polarity.

6. A load drive circuit as set forth in claim 5 wherein the battery has a common terminal, wherein the field-effect transistor is a p-channel transistor having a gate electrode, and wherein the bias means comprises a conductor that couples the gate electrode to the battery's common terminal.

7. In a system having an inductive load that is powered by a battery having a positive terminal and a negative terminal, a load drive circuit with reverse-battery protection, comprising:

a first switch coupling the battery to the load so as to establish a path for current through the load;

means defining a path for recirculating current around the load, including a recirculating diode and an N channel field-effect transistor coupled in series with each other, the transistor having a gate terminal, a source terminal and a drain terminal, the drain terminal being coupled to the recirculating diode and the source terminal being coupled to the load and to the positive terminal of the battery;

a boost circuit coupled to the battery and to the gate terminal of the field-effect transistor for turning the field-effect transistor on when the battery is coupled to the load with its nominal polarity, and for holding the field-effect transistor off responsive to the battery being coupled to the load with a reverse polarity.

8. In a system having an inductive load that is powered by a battery having a positive terminal and a negative terminal, a load drive circuit with reverse-battery protection, comprising:

a first switch coupling the battery to the load so as to establish a path for current through the load;

means defining a path for recirculating current around the load, including a recirculating diode having an anode and a cathode, the cathode being connected to the battery's positive terminal, and a P channel field-effect transistor having a gate terminal, a drain terminal connected to the anode of the diode, and a source terminal coupled to the load; and bias means coupled to the gate terminal of the field-effect transistor for turning the field-effect transistor on when the battery is coupled to the load with its nominal polarity, and for holding the field-effect transistor off responsive to the battery being coupled to the load with a reverse polarity.

* * * * *